Jan. 2, 1951
N. B. MEARS ET AL
2,536,383
PROCESS FOR MAKING RETICLES AND OTHER
PRECISION ARTICLES BY ETCHING
FROM BOTH SIDES OF THE BLANK
Filed Sept. 2, 1947
2 Sheets-Sheet 1
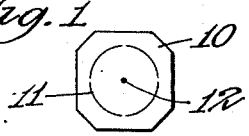
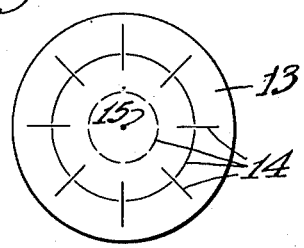
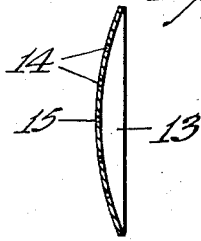
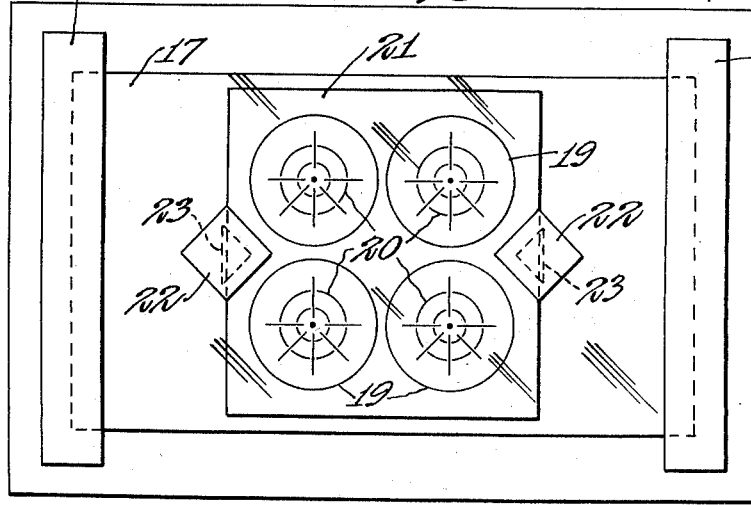
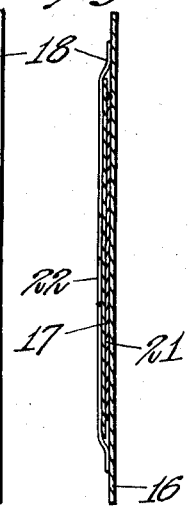
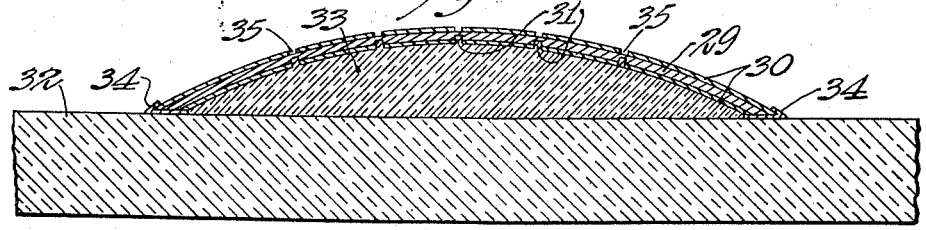
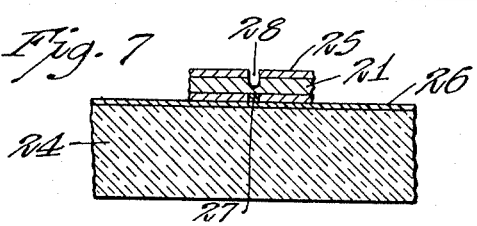
INVENTOR.
Norman B. Mears
Harvey T. Holsapple
BY John E. Thyker
ATTORNEY

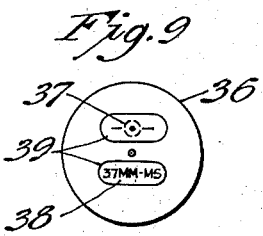
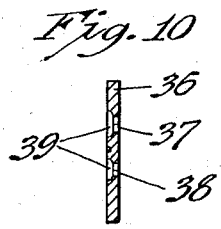
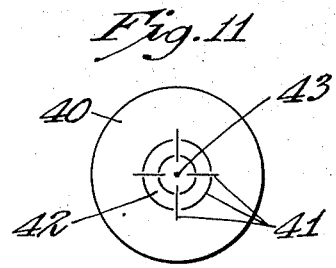
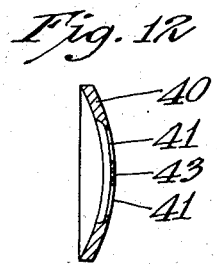
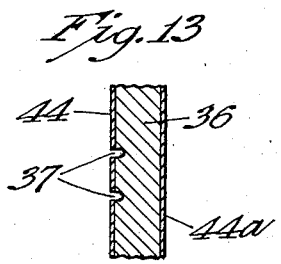
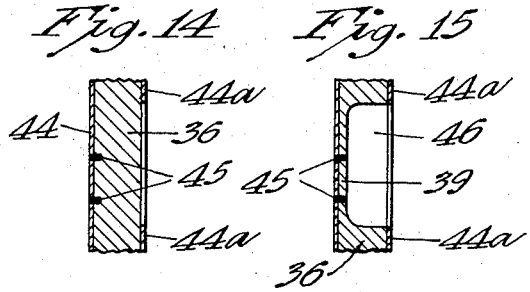

Patented Jan. 2, 1951

2,536,383

UNITED STATES PATENT OFFICE 2,536,383

PROCESS FOR MAKING RETICLES AND OTHER PRECISION ARTICLES BY ETCHING FROM BOTH SIDES OF THE BLANK

Norman B. Mears, West St. Paul, and Harvey T. Holsapple, Minneapolis, Minn., assignors to Buckbee-Mears Company, St. Paul, Minn., a corporation of Minnesota Application September 2, 1947, Serial No. 771,758
In Canada October 13, 1943

12 Claims. (Cl. 95—5.7)

This invention relates to reticles for optical instruments and particularly to those for gun sights or other ordnance fire control instruments wherein a network of lines or design is transparent and the field or background is opaque.

Our improved reticles are formed from metal sheets of sufficient thickness to be self-sustaining when supported only at their peripheries or perimeters in the particular instruments for which they are intended. The designs comprising fine, transparent lines or perforations usually from .01 to .001 inch or less in width are located with accuracy controlled within $2/10,000$ of an inch and clear cut, uniform lines as fine as $1/1000$ of an inch in width or finer may be produced when required. In gun sights and other fire control instruments artificial light is projected from one side of the reticle (usually the lower side) through the transparent design to reproduce the design on an object lens or other transparent member within the field of vision of the instrument beyond the opposite or upper face of the reticles. Under some operating conditions direct rays of the sun enter through the object lens and converge on the reticle with the result that the latter is heated to a temperature so high as to cause rapid deterioration of reticles of the composite type such as those constructed from metal films on supporting glass. By constructing our reticles from tough, malleable metal, such as copper, we afford adequate resistance to such high temperatures and at the same time impart ample strength to withstand vibrations and sudden pressure variations to which the reticles are subjected. For most uses the thickness of our copper reticle need not exceed approximately $6/1000$ of an inch.

It is an object of the present invention to provide an improved homogeneous reticle or like article of precision having transparent lines and/or other perforations of the requisite fineness, accurately located and clear cut.

A further object is to provide a novel process for making such reticles or precision articles from sheets of metal in an economical manner suited to large scale commercial production.

A particular object is to manufacture such reticles by novel and simplified procedure including photo-mechanical layout of the individual reticles and reproduction of the designs on the blanks followed by etching procedure to form both the transparent designs and peripheries of the reticles in accurate predetermined relation to the designs.

Referring to the accompanying drawings:

Figure 1 is a front elevation showing one of our improved reticles of the flat type;

Fig. 2 is a cross section through the same;

Fig. 3 is a plan view of one of our concavo-convex reticles;

Fig. 4 is a cross sectional view of the reticle shown in Fig. 3;

Fig. 5 is a plan view illustrating one of the steps in our process for photo-mechanically printing the designs and outlines of a group of reticles on a metal blank;

Fig. 6 is a vertical section through the negative envelope and blank shown in Fig. 5;

Fig. 7 is a fragmentary, sectional view on a greatly enlarged scale illustrating one of the steps in the formation of a transparent line in a flat blank;

Fig. 8 is an enlarged sectional view illustrating one of the steps in the process for forming a dish shaped or concavo-convex reticle;

Fig. 9 is a front elevation showing a reticle which is formed on a thicker metal blank;

Fig. 10 is a central vertical section through the reticle shown in Fig. 9;

Fig. 11 is a front elevation showing another form of reticle;

Fig. 12 is a central vertical section through the device shown in Fig. 11, and

Figs. 13, 14 and 15 are fragmentary vertical sections, on a greatly enlarged scale, illustrating successive steps in our procedure for forming fine, clear cut designs or perforations in the thicker blanks of Figs. 9 to 12 inclusive.

The reticle illustrated in Figs. 1 and 2 comprises a thin metal body 10 of uniform thickness throughout and having sufficient rigidity to be self-sustaining when supported at its perimeter in an instrument such as a gun sight or the like. Where the smaller reticles are constructed from copper adequate strength and rigidity may be imparted by using sheets from $1/1000$ to $6/1000$ of an inch in thickness. The reticle illustrated in Figs. 1 and 2 has a circular design comprising arcuate line segments 11 extending through the body 10 and a minute central perforation 12. This design has transparent lines some of which are approximately $1/1000$ of an inch wide and uniform in width. The ends of the arcuate segments 11 are separated by filaments of metal which support the circular center portion.

The larger reticle shown in Figs. 3 and 4 comprises a concavo-convex disk 13 formed with transparent lines 14 some of which are disposed radially and others having arcuate segments disposed in concentric circles around a minute central perforation 15. The arcuate line segments are separated from the radial lines by filaments of metal and similar filaments interrupt the inner circle of the design to support the central portion of the reticle. The disk 13 is of uniform thickness, preferably equal to about $9/1000$ of an inch, and the width of the lines and other perforations of the design may be as fine as desired. It will be understood that reticles of numerous other shapes, thicknesses and sizes and with a great variety of designs may be provided within the spirit of our invention.

According to our preferred procedure, pure copper sheets of convenient size for handling (approximately eighteen inches square, for example) and of uniform thickness equal to that of the reticles required are burnished to give them clean, fine-toothed surfaces and are then coated on both faces with a light-sensitive enamel. Either a cold top or hot top enamel may be employed. A suitable cold top enamel may be composed of the following ingredients in the proportions indicated:

Water _____ ounces__ 160
Ammonium carbonate _____ do____ 3½
Orange shellac _____ pounds__ 1
Ammonium bichromate _____ grains__ 360

The coating must be uniform and of substantial thickness. To produce this, the liquid composition is applied while the copper sheet is mounted on a spinner rotating in a horizontal plane and while warm air is directed against the face of the sheet to dry the composition. A plurality of coats of the enamel are usually required, each one being dried before the subsequent coat is applied. The coated sheet is then cut into smaller rectangles of sizes convenient for handling and with a view to producing a maximum number of reticles on each metal blank.

For use in contact printing of the outlines and designs for a group of reticles, suitable transparent negatives are prepared photographically from accurate line drawings in accordance with procedure which is well known in the art. Duplicate negatives are superimposed one on the other with the reticle outlines and designs of the respective negatives in registry with each other. These superimposed negatives are then fastened together along opposite margins to form an envelope for one of the metal blanks. A typical arrangement of the negatives and blanks is illustrated in Figs. 5 and 6 of the drawing wherein negatives 16 and 17 are shown superimposed one on the other with the outlines and designs for four reticles in registry with each other. Adhesive strips 18 extend along the ends of the negatives to fasten them together, leaving an opening along a longitudinal margin to admit a metal blank 21 between the negatives. The lines on the negatives representing the peripheries of the reticles are indicated by the numerals 19 and the interior designs, which must be accurately located with respect to the periphery, are indicated by the numerals 20. To temporarily fasten the blank 21 within the envelope formed by the negatives, in proper relation to the several designs, suitable adhesive tape members 22 may be employed. These are affixed to the outer face of the negative 17 over triangular openings 23 formed therein so that the inner, adhesive coated surfaces of the members 22 make contact with the metal blank to hold it in fixed relationship to the negatives. With a 45 ampere lamp at a distance of 35 to 36 inches, exposure of the negatives for from two to four minutes has been found to be sufficient in most cases. Such exposure renders the exposed area of the cold top enamel insoluble to the developing solution which is subsequently applied but leaves the images of the designs and outlines of the individual reticles in soluble condition. The lines are then developed by thorough washing in a solution such as the following in the proportions indicated:

Denatured alcohol _____ gallons__ 5
Malachite, green _____ grains__ 200
Distilled water _____ ounces__ 32

This is applied until the lines appear sharp and clean on the blank which is then washed in water and dried. The lines are now ready for etching into the metal.

It will be evident that the selection of the reagent for etching is dependent on the character of the material comprising the blank. Where the latter is made of copper, the operator may apply a protective coating of asphaltum or other resist to the edges and one face of the blank and a number of the blanks may be temporarily attached to a supporting plate of glass or other suitable material using the asphaltum or other resist or masking material as an adhesive and leaving one face of the blanks exposed for the first etching treatment. The work is now placed in an etching machine wherein ferric chloride or other etching agent is used to etch the lines to a predetermined, uniform depth and to define the width of the lines on the exposed enamel-coated face. Fig. 7 of the drawing illustrates a fragmentary part of the assembly of the work on a glass plate 24 and with the thickness of the various materials greatly enlarged for clearness, but not necessarily to scale. As here shown, a fragment of the metal blank 21 has the cold top enamel coating 25 on both faces and the asphaltic masking material 26 covers one face and constitutes an adhesive for securing the blank to the plate 24. One of the lines is shown as having been etched part way into the blank 21 to form a depression 28 and one of the photo-printed lines 27 on the opposite face of the blank is shown in registry with the partially etched line.

Use of ferric chloride of 40 degrees Baumé test for a period of 2 to 5 minutes is usually sufficient to cause the depressions 28 corresponding to the lines of the design to penetrate to the desired depth in the metal. By careful control of the time, both the width and depth of penetration is regulated to give the desired width of line. For flat reticles, such as those shown in Figs. 1 and 2, the etching from one face is extended approximately half way through the metal blank. Subsequently the etched depressions 28 are filled with a resist or masking which may comprise a transparent wax or paraffin adapted to prevent access of the etching agent and widening of the depressions during the subsequent etching from the opposite face of the blank. Thermo-plastic masking materials are preferred because they may be applied in a hot liquid condition and caused to fill the minute depressions while forming a continuous coating on all surfaces to be protected from the etching agent. When such protective filling has hardened in the etched depressions the blank is reversed on the supporting plate and the masking material is removed from the photo-printed and developed lines on the outer, unetched face by the use of a suitable solvent, leaving the enamel in place on the other surfaces. With the metal thus exposed over the precise area of the design, the work is subjected to further etching until the designs and the circles defining the peripheries of the individual blanks are caused to completely penetrate the metal. In some cases the final finishing operation to insure uniformity in the width of lines is carried out manually by the use of a fine brush and the etching solution. The resulting reticles are placed in a cleaning solution such as trichlorethylene which is finally removed by washing in a caustic solution followed by a water bath. Where non-reflecting surfaces are required, the blanks are oxidized by immersion in suitable sulphur compound which is also washed off after a short period of immersion.

It will be evident that the groups of blanks may be retained intact until the etching from the second face of each has been completed. This greatly facilitates the handling of a large number of the reticles. Since the outer peripheries of the individual reticles are formed by the etching procedure simultaneously with the etching of the transparent lines of the interior design, we insure not only the accurate sizing of the reticles but also the accurate location or centering of the transparent design with respect to the periphery of each.

Our procedure for making the concavo-convex or dish shaped reticles, exemp'ified by the one illustrated in Figs. 3 and 4, is like that hereinbefore described with reference to the flat reticles up to and including the mounting of the flat blanks on the supporting plate preparatory to etching. To proceed from this point, we etch the design and outline of the several reticles on a blank part away into one face. The fine line design is preferably caused to penetrate to a depth of about one-third of the thickness of the blank and then masking material is applied to the design to fill the depressions and this is followed by etching of the outlines or peripheries of the several reticles completely through the metal thus forming individual flat blanks. These blanks are then removed from the supporting plate and are severally shaped to the desired curvature using a simple press having mating dies accurately fitting the periphery and both faces of the individual blanks. Each blank is placed in the press with its etched face in contact with the convex die member. This minimizes distortion of the partially etched design during the shaping operation so that accuracy is not materially affected.

The succeeding step in the operation is illustrated in Fig. 8 wherein the dish shaped blank 29 is shown with its enamel coating 30 and with the etched depressions 31 defining the partially etched lines in the concave face. As further illustrated, the blank is attached to a supporting plate 32 of glass or other translucent material using a filling of translucent wax 33 between the concave face of the blank and plate and with suitable masking material 34, e. g., asphaltum, to protect the periphery of the blank from the etching solution which is subsequently applied. The wax 33 is preferably a thermo-plastic, translucent material such as paraffin which is inert in the etching solution and is applied to the several blanks while in a hot liquid condition and while the blanks are supported with the concave side up so that the several depressions 31 are completely filled with a protective etching resist. When the filling has cooled and hardens, the several blanks are secured to the supporting plate 32 by means of the adhesive masking material 34. Then the masking material previously applied to the openings 35 in the enamel 30 at the convex face of the blank is removed by the use of a solvent or otherwise as required to produce the assembly shown in Fig. 8.

As the next step, the assembly including the blank, together with others similarly mounted on the plate 32, is placed in the etching machine where the openings 35 representing the design in the enamel coating at the convex face of the blank allow the etching to proceed completely through the blank. The etching is continued until the designs appear clear-cut and transparent. During this etching, access of the etching agent to the depressions 31 in the concave face is prevented by the wax filling material 33. The end point may be readily determined by inspection where the support 32 as well as the wax filling material 33 are translucent. With a light beneath the plate 32 the operator inspects the transparent lines by observation through a magnifying glass at the opposite or convex face of the blank. Without removing the several reticles from the glass support slight irregularities in the lines may be corrected by the use of a sharp instrument or by manual etching, as required. The final cleaning operation and, where required, the oxidation of the surfaces may be accomplished as described with reference to the flat reticles.

By constructing our reticles from sheet metal of uniform thickness throughout and only thick enough to constitute a self-sustaining unit, we greatly facilitate the precise formation of fine line designs wherein uniformity of width and clarity of lines is maintained. This feature has the further advantage of minimizing the time required for etching and amount of etching solution used in the process. We also reduce the cost of manufacture by our use of duplicate negatives to photo-print both faces of a large number of blanks simultaneously and by using the flat negatives for printing both the plane and dish shaped reticles, including reticle outlines. By die-shaping the concavo-convex b'anks after the design has been etched on the concave face and by subsequently completing the etching from the convex face, the procedure is simplified without losing accurate control of the width of the lines and other dimensions of the design or causing detrimental distortion during the shaping.

Where the lines are to be formed by etching procedure as hereinbefore described, a practical upper limit for the thickness or the metal blanks is equal to approximately $2/100$ of an inch since irregular lines result if it is attempted to etch lines from either face to a depth greater than about $1/100$ of an inch. The lower limit of thickness of metal is dependent on the diameter of the reticles and condition where it is to be used, but experience indicates that with presently available and suitable metals, thickness of less than $2/1000$ of an inch would render the devices insufficiently rigid to be self-sustaining under ordinary conditions of use.

The reticle shown in Figs. 9 and 10 comprises a metal disk 36 which is substantially thicker and more rigid than those shown in Figs. 1 to 4 inclusive. A disk approximately an eighth of an inch thick, for example, may be used. A fine, transparent network of lines or designs, indicated generally by the numeral 37, is cut through the metal of the disk and in some cases other fine line perforations, such as the legend 38, may also but cut through the disk according to our invention. The thickness of the material 39 immediately adjacent to the legend and design is greatly reduced being preferably from $2/1000$ to $1/100$ of an inch in thickness.

The reticle shown in Figs. 11 and 12 comprises a metal body 40 of dish shape having the inner and outer faces which are respectively concavely and convexly spherical, or of other desired shape. A fine line design 41 consisting of radially extending and arcuate, concentric lines, extends through a central portion 42 of the body 40 which is reduced to the desired thickness of from $2/1000$ to $1/100$ of an inch. In addition to the several fine lines of design 41, the body 40 has a minute central perforation 43. The segments of the central portion 42 are connected together by filaments of metal along opposite sides of the radial lines shown.

Our procedure to form the fine lines, perforations or other design on the selected areas of the thicker metal blanks will be understood from the following detailed description. The blank is ordinarily die cut from sheet or plate metal to the desired size and where required is shaped by suitable forming and stamping operations followed by buffing to produce smooth faces. These are then burnished with a fine abrasive to give fine toothed surfaces. At least one of these surfaces is then rendered light-sensitive by applying a solution of either cold top or hot top enamel, as hereinbefore described, each coat of the solution being dried before the subsequent coat is applied.

Subsequently the required design is projected on the sensitized coating thus formed on the blank by the use of a transparent negative. For this purpose a photograph of a drawing of the desired design may be prepared in such manner that a silver emulsion capable of being "stripped" or transferred to a previously prepared negative support is produced according to conventional practice. For accuracy the negative must be shaped to fit the metal blank before the silver emulsion is transferred to it. As the negative support, a disk of transparent Celluloid or other suitable plastic material may be used. After heating the plastic disk to soften it, it is placed under pressure between two of the stamped out metal blanks with which it is to be used and is allowed to set in this shape. To a face of this support the design in the form of a silver emulsion transfer is "stripped" to complete the negative.

After this negative has dried it is held in contact with the sensitized coating of the metal blank in a suitable vacuum frame. Firm, uniform contact is thus maintained between the negative and the light sensitive coating on the metal blank while the design is reproduced on the coating by exposure of the negative and blank under an arc lamp of suitable power. With a 45-ampere lamp at a distance of thirty-five to thirty-six inches, exposure of the negative for from two to four minutes has been found to be sufficient. Such exposure renders the exposed area of the cold top enamel insoluble to the developing solution which is subsequently applied, but leaves the image of the design in a soluble condition. The fine line design is then developed by applying a solvent such as that described with reference to the thinner blanks. This is applied until the image appears sharp and clean on the blank which is then washed in water and dried. The image is now ready for etching into the metal.

Where the blank is made of copper, a protective coating of asphaltum or other resist is next applied to the edges and back face of the blank which have not previously been covered with the enamel, leaving the design open for etching. The work is then placed in an etching machine and etched with a suitable reagent or by electrolysis. The etching is thus caused to penetrate the surface of the metal to a uniform depth of from $2/1000$ to $1/100$ of an inch. It has been found that the required accuracy, uniformity and fineness of line cannot be obtained if the etching is allowed to penetrate the metal to a greater depth.

Fig. 13 of the drawing illustrates the blank 36 with the design 37 etched into the photo-printed face having an enamel coat 44 and forming depressions corresponding precisely to the design. The back face of the blank is shown with a protective coat 44a which may comprise an asphaltum or other suitable resist. Proceeding with the blank shown in Fig. 13, the etched depressions constituting the design are filled with a protective paint or mastic 45, such as aphaltum, and the protective coat 44a of asphaltum or other resist is removed from an area of the back of the blank greater than the area of the design and in registry therewith, as shown in Fig. 14. Now the thickness of the blank directly back of the design is reduced uniformly over an area greater than that of the design, as illustrated in Fig. 15, preferably by etching procedure. With a copper blank ferric chloride of the same grade as that used in etching the design on the front of the blank may be used on the back face. The etching from the back is carried to the point where the black of the asphaltum filling 45 begins to show through. Using a fine brush, the operator may manually complete the operation by applying ferric chloride until all of the lines appear uniformly and sharp in black. The recess formed by etching from the back is indicated by the numeral 46 in Fig. 15. It extends in from the back to precisely meet or intersect the depressions constituting the design from the back. This leaves metal of uniform thickness in the immediate vicinity of the design equal in thickness to the depth of the etched depressions in the front face of the blank, i. e., from $2/1000$ to $1/100$ of an inch thick. Finally the blank is placed in a cleaning solution adapted to dissolve the asphaltum or other filling for the design as well as the other staging material or enamel. By holding this finished reticle to the light the entire design appears fully open and sharp.

Other known or suitable chemical etching agents may be substituted for the ferric chloride herein specifically referred to, depending on the metal of which the blanks are made and it will be understood that as an alternative etching by electrolysis may be employed.

To increase the illumination of the image it is sometimes desirable to form a highly light-reflecting surface on the face which is to be exposed to artificial light. This may be accomplished by coating or plating on a white metal, such as silver, after the design has been etched through and while protecting the lines or perforations by the use of a filling of suitable masking material. For example, electro-plating with silver in this manner gives the desired reflecting surface without detracting from the clarity of the design.

According to our invention as hereinbefore described with reference to Figs. 1 to 15 inclusive, where depressions representing a fine line design are produced by etching part way through a metal blank from one face and then perforating the blank by etching from the opposite or back face over an area equal to or greater than that of the design, the step of filling the etched depressions in the first face with a protective etching resist material before proceeding with the etching from the second face of the blank is essential to prevent access of the etching agent to said depressions during the second etching treatment and thereby prevent irregular widening of the depressions. This is particularly important where clear cut fine line perforations of uniform widths less than .01 inch are to be formed and accurately located in a reticle for a precision instrument.

The present application is a continuation in part of our application Serial No. 460,822, filed October 5, 1942, for Reticle and Process for Making the Same, now abandoned, and a continuation in part of our application Serial No. 497,486, filed August 5, 1943, for Process for Making Reticles, now abandoned.

Having described our invention, what we claim as new and desire to protect by Letters Patent is:

1. The process for forming a reticle or like article of precision with perforations of width not exceeding .01 inch constituting a precise design on a metal blank of self-sustaining thickness which comprises, applying a light-sensitive protective coating to at least one face of said blank, photo-printing an image of the design on said coating, removing the unexposed portions of said coating to expose the underlying surface of the blank and form openings in the coating corresponding to the design, etching the blank through the openings thus formed in the coating to form depressions of a substantial depth not exceeding .01 inch and less than the thickness of the blank while covering the opposite face of the blank with a protective layer, filling the etched depressions in said blank with a protective material, removing the protective layer to expose an area of the opposite face of the blank equal or greater than the area of said depressions and in registry with the depressions and etching material from the area so exposed to such depth as to intersect said etched depressions and to form perforations in the metal blank of uniform width defined by smooth, clean cut surfaces.

2. The process for forming a reticle or like article of precision with minute perforations constituting a precise design on a metal blank, which comprises: applying a light-sensitive coating to a face of said blank and applying a protective layer to the opposite face of said blank, photo-printing an image of the design on said coating, removing the unexposed portions of said coating to expose the underlying surface of the blank and to form openings in the coating corresponding to the design, subjecting the exposed surfaces of the blank to the action of an etching agent to etch the design on the blank through the openings thus formed in the coating and to form depressions of uniform width equal to that desired in the final design and of a substantial depth not less than the thickness of the blank and not exceeding .01 inch, filling the etched depressions with a protective material to prevent access of the etching agent to said depressions to thereby prevent widening of the depressions, removing the protective layer from said opposite face of said blank in an area registering with and at least equal to that of the etched depressions of said design, subsequently etching material from said area to such depth as to intersect said etched depressions, whereby to form minute perforations in the metal blank of uniform width defined by smooth, clean cut surfaces, and finally removing the protective material from the perforations in the blank thus formed.

3. The process for forming a self-sustaining reticle or like article of precision with a plurality of unconnected perforations constituting a fine line precise design on a metal blank, which comprises: applying a light-sensitive coating to one face of said blank, photo-printing an image of the fine design on said coating, removing the unexposed portions of said coating to expose the underlying surface of the blank and to form unconnected openings in said coating corresponding to said fine line design, subjecting the exposed surfaces of said blank to the action of an etching agent to etch said design on said blank through the openings thus formed in said coating and to form separate fine line depressions of a uniform width not exceeding .01 inch and of a depth of .002 inch to .01 inch and less than the thickness of the blank, filling the etched depressions with a protective material to prevent access of the etching agent to said depressions to thereby prevent widening of the depressions, etching material from the opposite face of said blank in an area registering with and at least equal to that of the etched depressions of said fine line design and to such depth as to intersect said etched depressions, whereby to form fine line perforations in the metal blank of uniform width defined by smooth, clean-cut surfaces, and finally removing the protective material from the perforations in the blank thus formed.

4. The process for forming a reticle or the like with perforations constituting a transparent design on a self-sustaining metal blank of uniform thickness not exceeding .02 of an inch, which comprises: coating both faces of the blank with a light-sensitive enamel, then photo-printing designs in registry on the respective faces of the coated blank, removing the enamel from the areas of the designs to form openings in the enamel on the respective faces of the blank, etching from one face of the blank through the openings in the enamel to form depressions of a substantial depth not exceeding .01 inch and less than the thickness of the blank while protecting the opposite face of the blank from exposure to the etching agent, then filling the etched depressions with a protective material and subsequently exposing the area of the openings at the second face of the blank to an etching agent, and etching material from the second face through the openings in the enamel therein until the depressions are intersected and the design appears clear cut.

5. The method of forming reticles on sheet metal which comprises, photo-printing fine line reticle designs on both faces of metal blanks with the designs on the respective faces in registry, leaving the metal exposed along the lines, applying a protective coating of masking material to one face and the edges of the blanks, temporarily attaching a number of the blanks to a translucent supporting plate, leaving only one face of each blank exposed for etching, then etching the lines to a predetermined uniform and substantial depth less than the thickness of the blank in the exposed faces of the blanks, then reversing the blanks on the supporting plate and filling the previously etched lines with a protective material, removing the masking material from the unetched faces of the blanks and etching the lines on the faces so exposed until the lines appear transparent, clean cut and uniform when observed by light transmitted through said supporting plate.

6. The method of forming a group of reticles on a unitary metal sheet which comprises, photo-printing fine line reticle designs and the outlines of the individual reticles on both faces of the metal sheet with several designs and outlines on the respective faces in registry, leaving the metal exposed along the lines, applying a protective coating of masking material to one face of the printed sheet, temporarily attaching the sheet to a translucent supporting plate, leaving one face of the sheet exposed for etching, then etching the lines to a predetermined substantial depth less than the thickness of the blanks in the exposed faces of the blanks, then reversing the sheet on the supporting plate and filling the previously etched lines with a protective material, removing the masking material from the unetched face of the sheet and etching from the face so exposed until the outlines of the individual reticles have completely penetrated the sheet and the lines of the reticle designs appear clean cut and transparent when observed by light transmitted through said supporting plate.

7. The process for forming a plurality of reticles on a unitary sheet metal blank which comprises coating both faces of the blank with light-sensitive material, then photo-printing a plurality of designs and the outlines of the reticles on both faces of the coating, with the several outlines and designs on one face in registry with corresponding figures on the other face, developing said designs and outlines to expose areas of the metal, etching the exposed areas to a predetermined substantial depth less than the thickness of the blank from one face of the blank, to thereby form depressions of the precise width required in the finished reticle, then filling the etched depressions so formed with an acid resist material to prevent widening of the depressions and thereafter etching through the openings in the coating at the opposite face until the metal has been perforated to thereby form transparent designs on a plurality of opaque reticles.

8. The process for forming a dish shaped reticle which comprises, coating both faces of a flat metal blank with a light-sensitive material, photo-printing identical fine line designs on both faces of the blank with the designs on the respective faces in registry with each other, leaving the metal exposed over the area of the lines, etching the lines from one face of the blank to a predetermined substantial depth not exceeding approximately one-third the thickness of the blank, then imparting a concavo-convex shape to the blank with said depressions located at the concave face of the blank, filling the etched depressions defining said lines with an acid resist material to prevent widening of the depressions by the subsequent etching and thereafter etching the lines from the convex face to completely penetrate the metal and thereby form a transparent design on an opaque field.

9. The process for forming a dish shaped reticle on sheet metal which comprises, coating both faces of a flat metal blank with a light-sensitive material, photo-printing identical fine line designs on both faces of the blank with the designs on the respective faces in registry with each other, developing the coating to leave the metal exposed over the area of the lines, etching the lines from one face of the blank to a predetermined substantial depth less than the thickness of the blank, then imparting a concavo-convex shape to the blank with the previously etched lines on the concave face thereof, then filling the etched lines with a protective material and thereafter etching the lines from the convex face to completely penetrate the metal and thereby form a transparent design on an opaque field.

10. The process for forming a plurality of dish shaped reticles from sheet metal which comprises, coating both faces of a flat metal blank with a light-sensitive material, photo-printing a plurality of reticle outlines and fine line designs on both faces of the blank with the designs on one face in registry with those of the other face, developing the coating to leave the metal exposed over the area of the lines, etching the lines from one face of the blank to a predetermined substantial depth less than the thickness of the blank, separating the individual reticles from the others by etching along the photo-printed outlines, then imparting a concavo-convex shape to each reticle, filling the etched depressions defining said lines with an acid resistant material and thereafter etching the designs from the convex faces of the several reticles to completely penetrate the metal and thereby form a transparent design on each in predetermined relation to its edges.

11. The method of forming a reticle on a metal blank of self-sustaining thickness not exceeding .02 inch which comprises, etching into one face of said blank a group of depressions defining lines not wider than .01 inch, discontinuing the etching when it has penetrated to a substantial depth less than the thickness of the blank and not exceeding .01 inch, filling said depressions with etching resist to protect them against further widening and thereafter etching in the opposite face of said blank an identical group of depressions in registry with the first group and continuing the etching from the second face to the precise depth necessary to meet the first group of depressions and to render the etched lines transparent, clean cut and uniform in width.

12. The method of forming a transparent reticle design on a metal blank of self-sustaining thickness which comprises applying a light sensitive protective coating to at least one face of said blank, photo printing an image of a design on said coating, removing the unexposed portions of said coating to expose the underlying surface of the blank and form openings in the coating corresponding to the design, etching said design from one face of the blank to a substantial depth less than the thickness of the blank and not exceeding .01 inch, filling the etched depressions with a protective material and then etching metal uniformly from an area of the opposite face of the blank greater than that of the design until the lines of the design appear clearly transparent and leaving metal of self-sustaining thickness over the area of the design.

NORMAN B. MEARS.
HARVEY T. HOLSAPPLE.

(References on following page)

REFERENCES CITED

The following references are of record in the file of this patent:

UNITED STATES PATENTS

| Number | Name | Date |
|---|---|---|
| 378,423 | Baynes | Feb. 28, 1888 |
| 424,228 | Schmaltz | Mar. 25, 1890 |
| 996,959 | Weinwurm | July 4, 1911 |
| 1,157,493 | Bardsley | Oct. 19, 1915 |
| 1,852,115 | Haggerty et al. | Apr. 5, 1932 |
| 1,922,434 | Gundlach | Aug. 15, 1933 |
| 1,937,146 | Gries | Nov. 28, 1933 |
| 2,042,049 | Heidenhain | May 26, 1936 |
| 2,088,399 | Gibson | July 27, 1937 |
| 2,166,367 | Norris | July 18, 1939 |
| 2,204,147 | Murray | June 11, 1940 |
| 2,217,334 | Diggory | Oct. 8, 1940 |
| 2,279,567 | Holman | Apr. 14, 1942 |
| 2,315,373 | Land | Mar. 30, 1943 |
| 2,333,251 | Huggins | Nov. 2, 1943 |
| 2,357,913 | Sigford | Sept. 12, 1944 |
| 2,389,504 | Guellich | Nov. 20, 1945 |
| 2,413,600 | Bierman | Dec. 31, 1946 |

FOREIGN PATENTS

| Number | Country | Date |
|---|---|---|
| 357,625 | Great Britain | Sept. 21, 1931 |